UNITED STATES PATENT OFFICE.

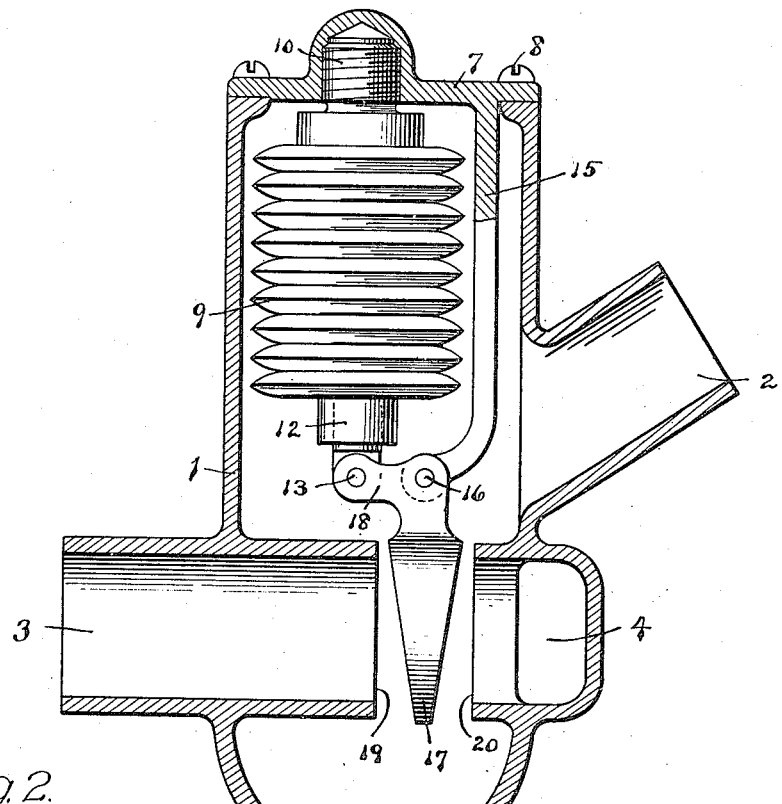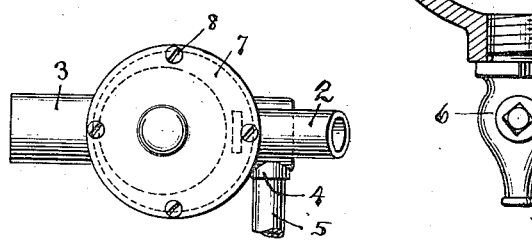

CHESTER F. JOHNSON, OF DETROIT, MICHIGAN.

TEMPERATURE-CONTROLLED VALVE.

1,127,627.

Specification of Letters Patent.

Patented Feb. 9, 1915.

Application filed June 18, 1914. Serial No. 845,749.

*To all whom it may concern:*

Be it known that I, CHESTER F. JOHNSON, a citizen of the United States, and a resident of Detroit, in the county of Wayne and State of Michigan, have invented a new and Improved Temperature-Controlled Valve, of which the following is a specification.

This invention relates to means for controlling the mixing of liquids of different temperatures, and its object is to provide a simple and efficient valve which shall be adapted to stop or reduce the flow of a liquid of higher temperature and to permit or increase the flow of a liquid of lower temperature when the mixture of the two liquids is above a predetermined temperature and to have the opposite action when the mixture is below this predetermined temperature.

This invention consists, in combination with a valve body having a plurality of inlets and an outlet, of a valve pivoted in such a manner as to swing freely between the inlets without engaging any portion of the valve body during such movement, thus avoiding friction, and means for swinging said valve, said means comprising a container filled with a medium that expands and contracts as its temperature rises and falls.

In the accompanying drawing, Figure 1 is a vertical section of this improved valve. Fig. 2 is a plan of the same on a smaller scale.

Similar reference characters refer to like parts throughout the several views.

The body 1 of the valve has an outlet 2 extending in any desired direction, an inlet 3 for a liquid of comparatively low temperature, and an inlet 4 for a liquid of higher temperature, a pipe 5 being shown connected to the latter. The bottom of the valve is preferably cup-shaped to receive the drain cock 6 so that sediment may be removed. Vegetable and mineral fibers and other impurities that enter through the inlets, instead of lodging between the valve and its seats and thus interfering with the movements of the valve, will fall into the cup 11. The movements of the valve can be observed by unscrewing the drain cock 6 and looking up into the body 1. A head 7 may be secured to the body by means of screws 8 and may support one end of the thermostat 9, of any desired construction, preferably of thin resilient metal rings, connected as shown in the drawing and having ends 10 and 12, the former connecting to the head 7 and the latter carrying a pivot 13. The container portion of this thermostat is preferably filled with a liquid having a high rate of expansion, such as chloroform, carbon bisulfid or benzole. Extending down from the head 7 is an arm 15, which carries a pivot 16 on which the valve 17 is mounted. An arm 18 on the valve connects to the lower end of the thermostat by means of the pivot 13. This valve is swung against the seat 19 when the liquid within the thermostat contracts, because of the resilience of the metal rings forming the thermostat, and it swings against the seat 20 when the liquid has expanded to a predetermined degree. When the hotter and cooler liquids enter the valve body at such temperatures and in equal amounts that the liquid passing out through the outlet 2 is at a predetermined temperature, the valve 17 may be held substantially central. But if the temperature of the mixture rises, the thermostat will expand and the valve 17 will be swung toward the seat 20, thus reducing the inflow of the hotter liquid and permitting an increase of the flow of the cooler liquid. On the other hand, should the temperature of the water surrounding the thermostat fall, the inflow of the cooler liquid will be reduced by the swinging of the valve toward the seat 19.

The openings through which the liquids flow into the body are shown to be in line with each other. The distance between the seats 19 and 20 will depend upon the thickness of the valve 17, the length of the arm 18, the rate of expansion of the thermostat, and the allowable variation in the temperature of the liquid flowing from the outlet 2.

I claim:—

1. In a control valve, the combination of a body having two inlet passages in line with each other and an outlet passage, a valve pivotally mounted to swing between said inlet passages, and a thermostat within the body connected to the valve to move it toward one or the other passage as the temperature of the medium within the body surrounding the thermostat changes.

2. In a control valve, the combination of a body having an outlet passage and two inlet passages in line with each other, a disk valve mounted between the inner ends of the passages, means to support the valve, an arm on the valve, a cover for the valve body, and a thermostat within the valve body, consisting of an expansible cylinder, connecting to said arm on said valve and said cover for swinging the valve between said inner ends of the passages as the temperature of the contents of the body changes.

3. In a control valve, the combination of a body, a top for the same, an arm extending down from said top, a valve pivotally mounted on the free end of the arm, a thermostat mounted within the body and connected to the valve to swing the same as the temperature varies, and pipes extending into the body in line with each other and on opposite sides of the valve so that the impacts of the liquids issuing from said pipes on the valve may be substantially balanced, said body having an outlet for the liquids entering through said pipes.

4. In a control valve, the combination of a body having two inlet openings and an outlet opening, a valve pivotally mounted to swing between said inlet openings, and a thermostat within the body connected to the valve to move it toward one or the other opening as the temperature of the medium surrounding the thermostat within the body changes.

5. In a control valve, the combination of a body, an arm within the body, a valve pivotally mounted on the arm, a thermostat mounted within the body and connected to the valve to swing the same as the temperature varies, and pipes extending into the body and on opposite sides of the valve so that the impacts of the liquids issuing from said pipes on the valve may be substantially balanced, said body having an outlet for the liquids entering through said pipes.

In testimony whereof I have signed this specification in the presence of two subscribing witnesses.

CHESTER F. JOHNSON.

Witnesses:
 EDWARD N. PAGELSEN,
 L. M. SPENCER.